Patented Oct. 11, 1927.

1,645,238

UNITED STATES PATENT OFFICE.

FREDERICK W. HUBER, OF RIVERSIDE, CALIFORNIA.

PROCESS OF MAKING TABLE SALT.

No Drawing.  Application filed February 20, 1923. Serial No. 620,274.

Rock salt as it usually occurs in nature contains too many admixed impurities to make it usable as an edible salt. Also, rock salt is a dense hard material which, even if milled into grains of approximately the grain size of table salt, dissolves quite slowly, so that it would not give the desired salty taste, if applied to solid food. Hence rock salt, if merely crushed to the grain size of table salt, would not be entirely suitable for use as table salt.

To make an edible salt, especially a table salt, the rock salt must (according to the common processes) be dissolved to form a solution, this solution freed of its impurities and a purified brine evaporated to produce a clean edible salt. The purification necessary will depend on the nature and amount of the impurities present. Some of the common impurities can be precipitated by adding a chemical capable of precipitating the same if desired while clay, sand and the like can be removed by sedimentation, or by filtration if desired, preferably after adding a small amount (.2% or so) of hydrated lime. This solution is then, in the prior art usually followed, evaporated to crystallization. If this step be conducted by direct heat at atmospheric pressure, the salt produced is too fine in grain for the majority of edible purposes. If, however, evaporation is conducted under a vacuum, the salt is of proper grain size for the majority of edible purposes and requires no grinding or grading. The equipment necessary for producing so-called "vacuum salt" is however very expensive, and the operation usually must be conducted on a very large scale to be profitable.

In many of the saline deposits in the arid West large bodies of rock salt occur which are often associated with mother liquor brines high in calcium chloride or in magnesium chloride from which it is a relatively simple matter by solar evaporation or otherwise to produce a concentrated and relatively pure solution of either calcium or magnesium chlorides. Also in the winning of sodium chloride by the evaporation of sea water there is produced, for every pound of sodium chloride, approximately a quarter of a pound of magnesium chloride associated with other magnesium salts. The making of the concentrated and relatively pure magnesium chloride brine from this waste product is a very simple matter and one which is conducted on a commercial scale.

Now, I have discovered that if a saturated sodium chloride solution be treated with an equal volume of a saturated or other concentrated solution of either calcium or magnesium chlorides, under proper conditions, a precipitate of sodium chloride is formed whose grain size approximates very closely the grain size obtained by evaporation under a vacuum, namely, about 1/40 inch. Agitation during this step is quite important, as it greatly assists in producing the salt crystals of uniform size at a rapid rate. The entire operation is preferably conducted rapidly, to prevent the crystals from growing too much. Thus if the solutions were allowed to stand several hours or over night, after mixing, a rather coarse salt would be formed, quite uneven in grain size.

The use of solution at atmospheric temperature, also greatly aids in producing crystals of small and uniform size, also the fact that the two solutions are both of approximately the same temperature is of importance in this respect.

In practice I preferably have both the liquids, and the mixed liquid, at about 20° C., or not more than five degrees above or below this temperature. In practice, I treat a volume of saturated sodium chloride brine which has been purified by sedimentation, filtration or any of the ordinary methods in common use with about an equal volume of a clarified concentrated solution of either calcium or magnesium chloride and thoroughly mix the two solutions. The two solutions are preferably at about ordinary atmospheric temperature, say about 20° C. The sodium chlorid solution may be of a gravity of about 1.2, containing about 26% NaCl. The calcium chlorid solution may be of a gravity of about 1.38, containing about 38% $CaCl_2$. This latter is about as strong as can readily be produced by solar evaporation. It is quite important to operate with highly concentrated solutions. These two solutions are preferably mixed in equal volumes, and the entire mixture well mixed together, by means of a suitable agitating device, and the mixture is preferably kept well agitated for, say 20 to 30 minutes. The entire mixture can then be allowed to stand for an hour or so, in order to allow the mass to come to equilibrium, and for the salt crystals to settle at the bottom. About three fourths of the entire quantity of sodium chlorid will thus be thrown down as small crystals, say about 1/40 inch in size, while the liquor will contain all of the calcium chlorid and the rest of the sodium chlorid, in solution. This clear liquor is then decanted or drawn off and saved for future use as described below. The precipitated sodium chloride is now dewatered in any convenient manner, e. g., by means of a continuous suction filter or centrifuge until the residual amount of liquid carried therein is reduced to between 2 and 6%. While still in the dewatering machine the precipitate is given a displacement wash preferably with saturated brine (NaCl solution of about 26%) to displace the bulk of the adhering spent mother liquor. After this operation the sodium chloride will be found to contain up to .5% of calcium in the form of calcium chloride. To this moist salt containing say 2 to 6% of water, I now add to and thorougly mix, the chemically equivalent amount of finely divided sodium carbonate, to combine with the calcium to form calcium carbonate. This may be conveniently effected by tumbling the mass in a suitable tumbling apparatus, such as rotary barrel, box, or the like, or any convenient mixing apparatus can be used. While dry sodium carbonate is the preferred precipitating agent, I could also use a saturated solution of this material, or could also use other precipitants, e. g., trisodium phosphate, disodium phosphate, (or possibly ammonium carbonate) as dry powders or strong solutions.

By this procedure the alkaline earth carbonate is precipitated uniformly, as a coating upon surfaces of individual salt crystals. The moist and so treated mass of salt is now dried in any of the usual salt driers and the resulting product is a properly sized "free running" salt, which will not become hygroscopic upon ordinary exposure to moist air. The drying is preferably conducted at a gentle heat, preferably not above 110° C., in a current warm dry air.

As an example of the use of magnesium chlorid solution, I will state that a magnesium chlorid solution of about 37% having a gravity of about 1.32, is mixed with a saturated solution of NaCl, (purified as above described) in the manner above described, the two being used in equal volumes. The further treatment will be as in the preceding example.

The object of adding the sodium carbonate to the salt while in the moist stage is first to produce a uniform precipitation of very finely divided alkaline earth carbonates which very effectively prevent the balling up and the aggregation of the salt particles during drying, which would necessitate grinding and sorting.

The residual liquor of calcium chlorid or magnesium chlorid, containing some sodium chlorid, is then reconcentrated, preferably by solar evaporation, substantially to saturation with the $CaCl_2$ or $MgCl_2$. During this operation the major part of the NaCl therein will precipitate or crystallize, and might be purified if desired, but preferably is sold in the crude state, for use as crude salt, e. g., for making ice cream, for salting hides and the like.

The brine after being used for washing the salt crystals can be treated with calcium chlorid brine, as above described, to throw down the contained NaCl. The relative volumes of these used will preferably be so adjusted as to give the same, Ca:Na ratio as in the first example.

Where readily obtainable, I prefer the employment of calcium chlorid brine, rather than magnesium chlorid brine, as the operation therewith is more readily adjustable, and the recovery and regeneration of the mother liquor is more simple.

The use of $Na_2CO_3$ in powdered form as the precipitant is preferred, rather than any other of the precipitants. It gives a product which seems to have somewhat better physical stability and operates more smoothly. Also it is cheap and is generally available everywhere.

In general, with my process, it is not necessary to previously purify the brine from $CaCl_2$ or $MgCl_2$, but it is well to treat the saturated NaCl solution with a little lime, then decant or filter, if it contains much clay or like impurities.

I claim:

1. A process of producing a free running salt which comprises (a) mixing together approximately equal volumes of highly concentrated solutions of calcium and sodium chlorides at approximately atmospheric temperature, (b) well agitating the mixed solution, whereby the major part of the sodium chloride is thrown out as small crystals, (c) promptly separating the crystals from the remaining liquor, (d) dewatering the crystals, (e) subjecting the crystals to a displacement wash with brine, (f) removing the washings but leaving the crystals in a moist state, (g) adding a precipitating agent capable of precipitating calcium compounds to the moist crystals, (h) thoroughly mixing the mass, and thereafter (i) drying.

2. A process of producing a free running table salt which comprises (a) mixing a substantially saturated solution of sodium chlorid with a solution of calcium chloride of about 1.38 sp. gr., such operation being conducted at about 20° C., and such solutions being used in about equal amounts, (b) thoroughly agitating the solution at about 20° C., and holding it at this temperature for not more than a few hours, (c) separating the crystals and the mother liquor from each other, (*d*) dewatering the crystals, (*e*) subjecting such crystals to a displacement wash with strong brine, (*g*) adding about 2 to 6% of dry pulverulent sodium carbonate to the still moist crystals, while the latter contain a fraction of a percent of calcium compounds, (*h*) thoroughly mixing the dry carbonate with the salt crystals and (*i*) finally drying the salts, containing the reaction products of the calcium compounds and sodium carbonate.

3. A process of producing a free running table salt which comprises (*a*) mixing a substantially saturated solution of sodium chlorid with a solution of calcium chloride of about 1.38 sp. gr., such operation being conducted at about 20° C., and such solutions being used in about equal amounts, (*b*) thoroughly agitating the solution at about 20° C., and holding it at this temperature for not more than a few hours, (*c*) separating the crystals and the mother liquor from each other.

In testimony whereof I affix my signature.

FREDERICK W. HUBER.